C. B. Kelley.
Horse Rake.

№ 88719                    Patented Apr. 6, 1869.

Witnesses.
Geo. Whitbeck
J. C. Spencer

Inventor.
C. B. Kelley

CALEB P. KELLY, OF PHELPS, NEW YORK.

Letters Patent No. 88,719, dated April 6, 1869.

---

IMPROVEMENT IN HORSE-RAKES.

---

The Schedule referred to in these Letters Patent and making part of the same.

---

*To all whom it may concern:*

Be it known that I, CALEB P. KELLY, of Phelps, Ontario county, in the State of New York, have invented an Improved Horse Hay-Rake; and I do hereby declare that the following is a full and exact description thereof, reference being had to the accompanying drawings, and to the letters of reference marked thereon.

The nature of my invention consists in certain improvements in horse wheel-rakes, whereby they may be fully controlled, and worked with the greatest ease by the operator, in hay or grain.

To enable others to make and use my invention, I will describe its construction and operation as follows:

A, axle.

B, the thills, which are bolted on the top of the axle, with the ends projecting in rear of the axle.

D is the rake-head, which is hung under the thills, just behind the axle, and works in bands or boxes.

I is the teeth, which are coiled against the rake-head, with the ends passing through the head, and fastened by nuts.

Figure 3:
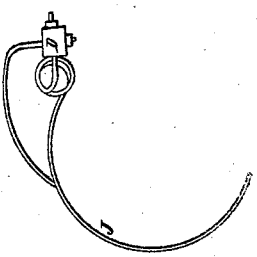

K are spring braces, for stiffening the teeth. These braces are fastened on the top of the rake-head D, as shown at D', in Figure 3; they are slightly curved, and have grooves in the ends which rest down upon the teeth.

When the teeth are pressed beyond their natural strength, as in damp or green hay, these braces support them, and prevent them from straightening in a measure; but if not required, the teeth can work independent of them, by simply turning them one side of the teeth.

F is a vertical standard, fastened on the axle A, having an insertion in the top, in which the hand-lever H, is inserted, and held by a pin.

Figure 1:
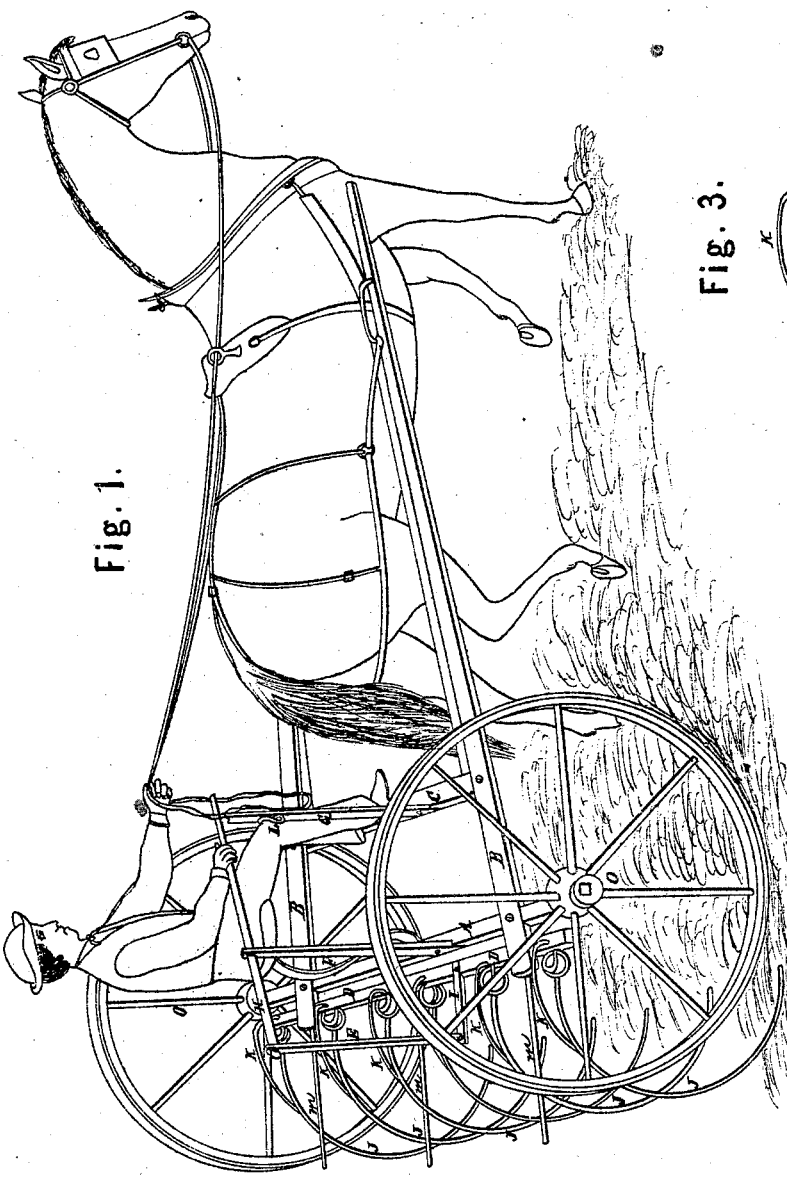
Figure 2:
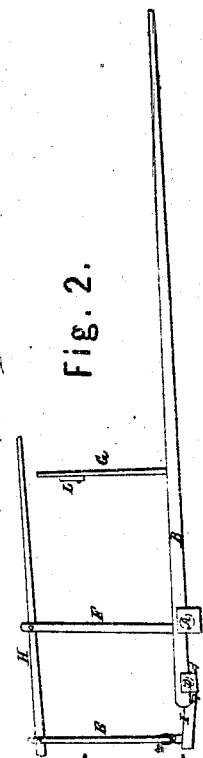

This lever H rests in an oblique position on the standard F, the rear end projecting down; and to this is attached the connecting-rod E, which connects at the lower end with the horizontal arm I, fastened upon the rake-head D, as shown at I, in Figure 1.

The operation of the rake by this combined lever, is clearly shown in fig. 1, at F, H, E, and I.

By shortening the purchase on the pry-lever H, a small boy can operate the rake with ease.

G is a vertical standard, fastened on the cross-bar C.

When the rake is in operation, the lever H rests upon this standard, and prevents the rake from rising, as shown clearly in fig. 1.

When one wishes to elevate the rake, he pulls the lever H to one side of the standard G, and presses down.

L is a hook, on the standard G, to hook over the lever H, to keep the rake elevated, when driving upon the road, or from field to field.

M M M are cleaning-rods, fastened stationary in the axle, and project between the teeth when the rake is being dumped. These rods prevent the hay or grain from rising with the teeth.

What I claim as my invention, and desire to secure by Letters Patent, is—

The standard F, lever H, the connecting-rod E, and horizontal arm I, in combination with the rake-head D, and the standard G, in connection with the cross-bar C.

C. P. KELLY.

Witnesses:
GEO. WHITBECK,
J. C. SPENCER.